No. 764,404. PATENTED JULY 5, 1904.
J. P. WICKERSHAM, C. W. TABLER & J. W. STEWART.
PROCESS OF MAKING INSECTICIDES.
APPLICATION FILED APR. 13, 1904.
NO MODEL.
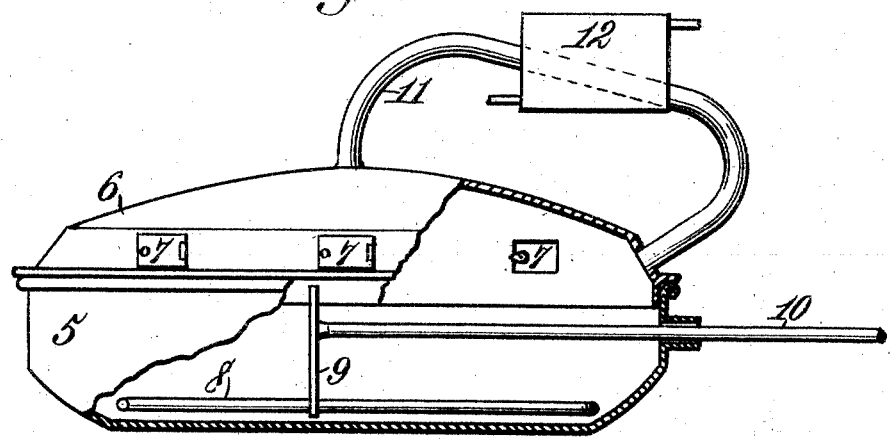
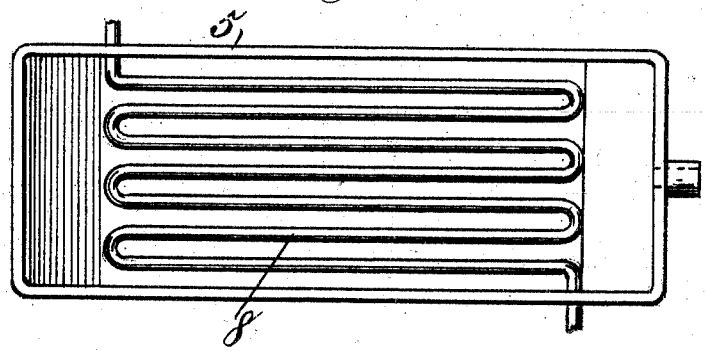
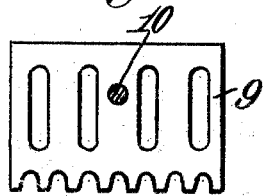
Witnesses.
Robert Everitt
James L. Norris Jr.
Inventors.
Joseph P. Wickersham,
Clifford W. Tabler,
John W. Stewart.
By James L. Norris
Atty.

No. 764,404. Patented July 5, 1904.

UNITED STATES PATENT OFFICE.

JOSEPH P. WICKERSHAM, CLIFFORD W. TABLER, AND JOHN W. STEWART, OF MARTINSBURG, WEST VIRGINIA.

PROCESS OF MAKING INSECTICIDES.

SPECIFICATION forming part of Letters Patent No. 764,404, dated July 5, 1904.

Application filed April 13, 1904. Serial No. 202,956. (No specimens.)

*To all whom it may concern:*

Be it known that we, JOSEPH P. WICKERSHAM, CLIFFORD W. TABLER, and JOHN W. STEWART, citizens of the United States, residing at Martinsburg, in the county of Berkeley and State of West Virginia, have invented new and useful Improvements in Processes of Making Insecticides, of which the following is a specification.

This invention relates to a process of making an insecticide.

The insecticide hereinafter set forth includes in its composition lime, sulfur, salt, iron sulfate, and mercury. These elements may be of any desirable proportions. Hereinafter we will set forth certain quantities of the several ingredients that have been found wholly satisfactory. By our process we are enabled to concentrate these materials into a relatively small volume, by reason of which the product can be readily transported and handled.

In our description of the process we will set forth, by weight, the amounts of the hereinbefore-mentioned ingredients in the production of a gallon of the product. By mixing one gallon of such product with forty-nine gallons of water or approximately such an amount of water an article is produced that is thoroughly effective for the extermination of various insects. The mixture, in fact, is particularly advantageous for the total eradication of the San Jose scale, which infests different kinds of fruit-trees.

The mixture, consisting of one gallon of the product and the amount of water stated, may be sprayed or otherwise applied to the trees. In case a stronger solution is desired less water will be associated with said product.

In the drawings accompanying and forming a part of this specification we have illustrated a simple form of apparatus which can be effectively utilized for carrying out the process. Other apparatus, however, may be employed in lieu of that shown and hereinafter described.

Referring to said drawings, Figure 1 is a side elevation of an apparatus such as that first mentioned with a portion thereof removed. Fig. 2 is a plan view of the lower section of the apparatus. Fig. 3 is a transverse section of Fig. 2.

Like characters refer to like parts in the several figures of the drawings.

Referring to the drawings by reference characters, the numeral 5 denotes a closed tank, vessel, or pan, the top 6 of which is removable. Said top is provided at suitable points with openings adapted to be closed by doors, as 7, through which openings the different ingredients that are to compose the product may be introduced into the tank. Upon the bottom of the tank 5 rests a steam-coil 8, into one terminal portion of which steam is introduced, the exhaust being carried out of the other terminal portion of the coil.

As will hereinafter appear, we subject the ingredients to agitation and for this purpose show an agitator or mixer, as 9. Said agitator or mixer is represented as consisting of a blade vertically disposed and adapted to be reciprocated in the casing for the purpose set forth. The blade is slotted, so that on the movement thereof the liquid can flow through such slots therein and will not retard the free motion of said blade. The latter may be actuated in any desirable way. We have shown it as provided with a projecting stem 10, adapted to extend through a suitable stuffing-box in one end of the tank or pan 5 and to be connected with any suitable power-applying factor. The lower edge of the blade is serrated, the longitudinal portions of the piping 8 fitting into the spaces of the serrations.

The top 6 of the pan or tank is removable in order that the liquid contents of said tank can be withdrawn. Centrally from the top the entering end of a worm 11 extends, the delivery end of the worm leading into the said top near its junction with the body of the tank. The condensing-worm 11 is surrounded at a suitable point in its length by a vessel 12, adapted to contain a suitable condensing agent, as water, which water or equivalent agent can be supplied to the vessel at its top and carried off therefrom at the bottom through suitable piping. The steam or vapor arising from the mixture in the tank 5 during the action of the process passes into the worm or conduit 11 and is condensed therein, the condensate being delivered by the worm into the tank. In this way, as will hereinafter be obvious, we obtain a concentrated or condensed solution.

Initially we slake twelve pounds of lime in water in the tank, steam of the proper temperature being admitted into the coil 8 in order to boil the solution thus made. We then add water to the slaked lime sufficient to cover the same and stir in fifteen pounds of sulfur. The slaked lime of course upon the introduction of the sulfur is subjected to a boiling action. Upon the mixture of the lime and sulfur the two ingredients are boiled for about half an hour. This boiling thoroughly associates the two materials. Their association is further aided by the action of the agitator or mixer 9, which at this point is being moved back and forth in the tank. At the expiration of the half-hour we add to the mixture thus formed a solution containing approximately four pounds of salt. The salt is preferably added to the other ingredients in solution, for we find that by adding it to the mixture in the shape of a solution it will more readily associate with the lime and sulfur. These three articles are then boiled for half an hour more, the agitation being continued in order to intimately amalgamate the several constituents. During the carrying out of the process up to this point there is of course steam generated in the pan. The steam enters the inlet or receiving end of the worm 11 and traverses the latter, being of course condensed in the worm by the cooling agent in the vessel 12, the condensate being discharged by the worm again into the vessel. After the mixture of the several parts we add about five grams of iron sulfate and then boil the several parts for ten minutes. At the expiration of this latter period we add about one-half ounce of mercury and by the action of the agitator 9 thoroughly mix the other ingredients in the solution with the mercury. The mercury is added for the purpose of uniting the lime and sulfur into a soluble solution.

During the carrying out of the process it will be understood that the steam generated in the tank is condensed while in the worm 11, the condensate being delivered by the worm back into the tank, and that simultaneously the solution is agitated. After the mercury is mixed with the other ingredients the supply of steam is cut off and the solution is permitted to cool. When cooled, sufficient time is permitted to elapse to insure the thorough precipitation of the solids in the solution, following which the liquid may be drawn from the tank in any desirable way—for example, by siphoning.

It will be understood that the several ingredients may be introduced into the openings in the hood or cover 6. By the process we assure the thorough association of the several substances and concentrate the mixture into a powerful insecticide. We have set forth the amounts of the different parts, by weight, in making one gallon of the product. These amounts may of course be varied within certain limits. The gallon resulting from the process may be diluted with forty-nine gallons of water and, as stated, a powerful insecticide will be secured. By varying the amount of water mixed with the product the strength of the final solution, or that which is put upon the trees, can be regulated. The said insecticide may be applied in any desirable or convenient way—say by spraying. It has been found in practice thoroughly satisfactory for the extermination of various kinds of insects which thrive upon fruit-trees, especially that insect known as the "San Jose scale."

We claim—

1. A process consisting of slaking lime in a closed vessel, adding sulfur to the lime while in the vessel, simultaneously boiling the lime and sulfur while in the vessel, and subjecting the same to agitation, then adding a salt solution to the mixture, then adding sulfate of iron and mercury to the mixture, then boiling and agitating the latter, removing the vapor arising from the boiled mixture, condensing the vapor, subsequently returning the condensate to the tank, and finally allowing the solids in the solution to precipitate to the bottom thereof.

2. A process consisting of introducing twelve pounds of lime into a closed tank, slaking the lime while in the tank and adding water thereto, introducing fifteen pounds of sulfur into said tank, then boiling the mixture, then adding a solution containing four pounds of salt, then boiling the mixture and adding five grams of iron, then adding mercury, then boiling the mixture, subjecting the liquid to the action of agitation while in the tank, removing the vapor from the tank during the boiling, condensing the vapors, and resupplying the same as condensate to the tank, and finally allowing the solids to precipitate in the solution.

In testimony whereof we have hereunto set our hands in presence of two subscribing witnesses.

JOSEPH P. WICKERSHAM.
CLIFFORD W. TABLER.
JOHN W. STEWART.

Witnesses:
  EDW. G. COX,
  H. H. EMMERT.